US006648516B2

United States Patent
Eriksson et al.

(10) Patent No.: US 6,648,516 B2
(45) Date of Patent: Nov. 18, 2003

(54) BEARING HOUSING WITH MEASUREMENT DEVICE

(75) Inventors: Reijo Eriksson, Katrineholm (SE); Daniel Premberg, Göteborg (SE); Leif Richardsson, Katrineholm (SE); Helmut Salsland, Gråbo (SE)

(73) Assignee: Aktiebolaget SKF, Gothenburg (SE)

( * ) Notice: Subject to any disclaimer, the term of this patent is extended or adjusted under 35 U.S.C. 154(b) by 26 days.

(21) Appl. No.: 10/120,496

(22) Filed: Apr. 12, 2002

(65) Prior Publication Data

US 2002/0164099 A1 Nov. 7, 2002

(30) Foreign Application Priority Data

Apr. 12, 2001 (SE) .............................................. 0101315

(51) Int. Cl.$^7$ .............................................. F16C 29/02
(52) U.S. Cl. ..................................................... 384/448
(58) Field of Search ................................ 384/448, 627, 384/624, 537; 73/593, 659, 660, 682, 683; 340/870.17, 870.26, 870.3, 682; 374/141, 153

(56) References Cited

U.S. PATENT DOCUMENTS

| | | | | |
|---|---|---|---|---|
| 4,092,053 A | * | 5/1978 | Riegler et al. ............... 384/448 |
| 5,433,525 A | * | 7/1995 | El-Ibiary ..................... 374/141 |
| 5,509,310 A | * | 4/1996 | El-Ibiary ..................... 73/660 |
| 5,642,105 A | * | 6/1997 | Duffy et al. ........... 340/870.17 |
| 5,746,452 A | * | 5/1998 | El-Ibiary et al. ............ 384/446 |
| 5,998,894 A | * | 12/1999 | Raad ........................ 310/66 B |
| 6,161,962 A | * | 12/2000 | French et al. ............... 384/459 |

* cited by examiner

Primary Examiner—Thomas R. Hannon
(74) Attorney, Agent, or Firm—Burns, Doane, Swecker & Mathis, LLP

(57) ABSTRACT

A bearing housing with a measurement device incorporating at least two sensors arranged to detect vibrations of a shaft rotatable supported in a bearing in the bearing housing, and arranged to communicate with external data collecting and/or processing means. The bearing housing has a base portion which, for weight reducing reasons, is provided with recessed cavities opening downwards. The sensors are positioned in one such cavity in a completely recessed manner and are arranged to detect vibrations in two perpendicularly opposed directions.

8 Claims, 3 Drawing Sheets

BEARING HOUSING WITH MEASUREMENT DEVICE

This application is based on and claims priority under 35 U.S.C. §119 with respect to Sweden Patent Application No. 0101315-0 filed on Apr. 12, 2001, the entire content of which is incorporated herein by reference.

BACKGROUND OF THE INVENTION

In many different applications of bearings supporting rotary loads, it is of great interest to know not only the rotational speed of the rotating shaft supported in a bearing disposed in a bearing housing, but also other parameters influencing the function of the bearing and/or indicating the condition of the bearing. Such other parameters are temperature and vibration. It is necessary to position a temperature sensing device inside the bearing housing as it is the actual internal temperature, which is of importance. It is also convenient to position an appropriate measuring device for recording the rotational speed inside the bearing housing as the rotating bearing race ring and the shaft are available therein and the sensor and the measuring device will have a comparatively protected position therein. Probably mostly for space reasons, vibration sensors have not been located inside the bearing housing, but have instead been positioned externally on the outside of the bearing housing, either on top of the bearing housing or on the upper side of the bearing housing base, where they can be fitted at especially prepared surfaces permitting correct positioning of the sensors in relation to the shaft. However, this earlier used positioning of the vibration sensors has some drawbacks, mainly due the fact that the sensors are positioned so that they project somewhat outside the rigid bearing housing wall and therefore might be subjected to influence from the surroundings, such as impacts, humidity and dirt.

The bearing housings in question can be of the type having lower and upper parts. The lower part includes a base portion on which is arranged a lower half of a bearing housing with an internal bearing, a seat, and having end openings for a shaft. The upper part of the bearing housing is connectable to the lower part by bolts. The base portion of the lower part is equipped with bolt holes for fitting the bearing housing to a frame. The lower side of the base portion in recent years has been provided with cavities opening towards the bottom of the base portion. The purpose of such cavities is primarily to reduce weight. Moreover, due to the fact that the provision of the cavities serves to reduce the area of the lower side of the base which rests upon the bedding or frame to which the bearing shall be attached, the difficulties involved in leveling the bearing housing base are reduced.

OBJECTS AND SUMMARY OF THE INVENTION

An object of the present invention is to provide a bearing housing with a measurement device for sensing vibration, which eliminates the above drawbacks.

The present invention relates to a bearing housing which includes a base portion that has a bottom exterior surface in which a cavity arrangement is formed. At least two vibration-detecting sensors are disposed within the cavity arrangement and are situated therein completely interiorly with respect to a plane defined by the bottom exterior surface. The sensors are arranged to detect vibrations in two perpendicularly opposed directions.

BRIEF DESCRIPTION OF THE DRAWINGS

The foregoing and additional features and characteristics of the present invention will become more apparent from the following detailed description considered with reference to the accompanying drawing figures in which like reference numerals designate like elements.

DETAILED DESCRIPTION OF A PREFERRED EMBODIMENT OF THE INVENTION

Figure 1:
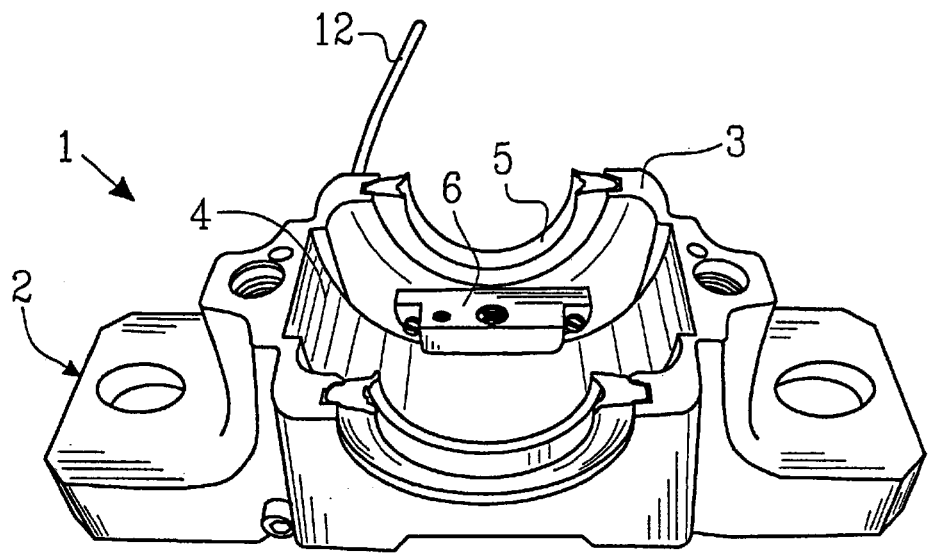
FIG. 1 shows a perspective view, obliquely from above, of a lower half of a bearing housing, illustrating a retainer for supporting a speed sensor and a temperature sensor inside the bearing housing.

FIG. 1 shows obliquely the lower half 1 of a bearing housing having a base portion 2 and a substantially semi-cylindrical bowl-shaped main part 3 projecting upwards from the base portion. The main part has a semi-cylindrical bearing seat 4, for supporting the outer ring of a rolling bearing, and two opposed semi-circular end openings 5 for passage of a shaft to be supported in the bearing. On the inside of the housing wall adjacent the bearing, seat 4 is provided with a first retainer 6 arranged to receive a sensor for detecting the speed at which the shaft rotates and/or a sensor for detecting the current temperature in the bearing housing. The readings from these sensors are preferably transferred via cable or in any other appropriate way to data collecting instruments or control units.

Figure 2:
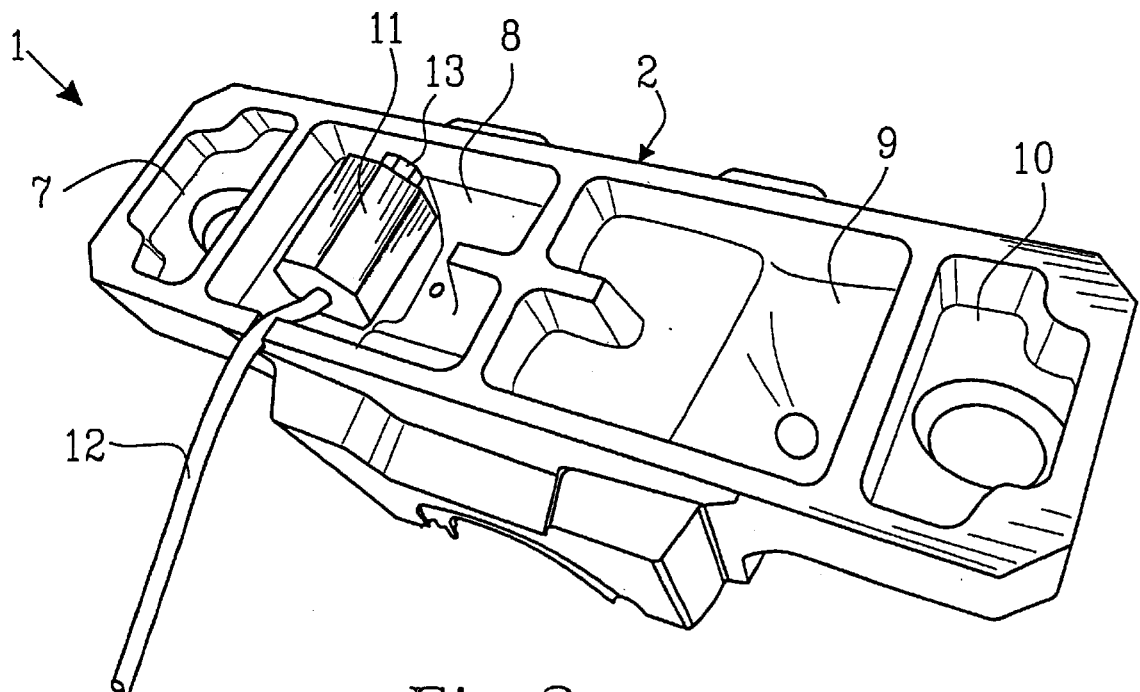
FIG. 2 is a perspective view obliquely from the bottom of the lower half of the bearing housing and showing the positioning of a retainer for supporting vibration sensors in a cavity in the lower side of the bearing housing base.

FIG. 2 shows, in a perspective view from the bottom, the bearing housing lower half 1. As can be seen from this view, the bottom exterior surface 2a of the base portion 2 is provided with a number of cavities 7, 8, 9, 10 which are primarily made for reducing weight but also for reducing the foot area with which the surface 2a is in contact with a frame or the like to which the bearing housing shall be fitted, thereby also reducing the requirement of treatment of the frame surface for leveling it.

In one of these cavities 8 is shown a second retainer 11, attached to the wall of the cavity 8, and being connected via a cable 12 to a data collecting and/or processing unit (not shown). As can be seen the retainer 11 is so positioned in the recessed cavity 8, that it is situated completely interiorly with respect to the plane of the bottom surface 2a of the base member 2, i.e., the retainer is completely recessed. This retainer is intended for supporting a number of vibration sensors or accelerometers, e.g., Monitran 134319 or other comparative sensors available on the market, the retainer thereby incorporating at least two such sensors arranged at known relative directions towards each other, and preferably perpendicularly to each other.

Figure 3:
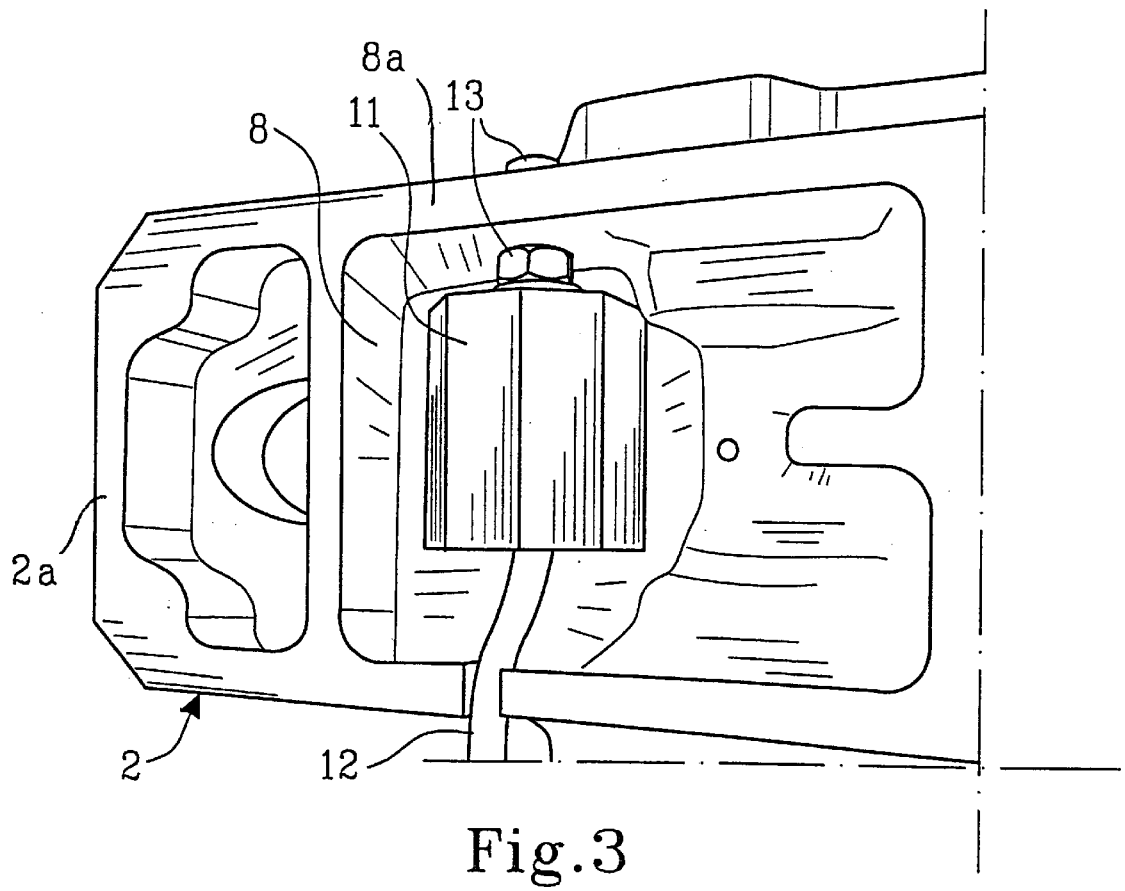
FIG. 3 is a larger scale view of a portion of the bearing housing base shown in FIG. 2 with the retainer for the vibration sensors.

As can be seen in FIG. 3, which in bigger scale shows a portion of the base portion 2 from below, the retainer 11 is detachably attached to a longitudinal wall 8a of the cavity 8 with the aid of a screw 13. Here it can also be seen that the retainer 11 is shaped as an elongated parallelepiped and has its short side attached against the longitudinal wall 8a, whereby it is ascertained that the retainer is positioned with its long length oriented perpendicularly to the longitudinal wall 8a of the bearing housing, and parallel to a width of the base portion 2.

Figures 4, 5:
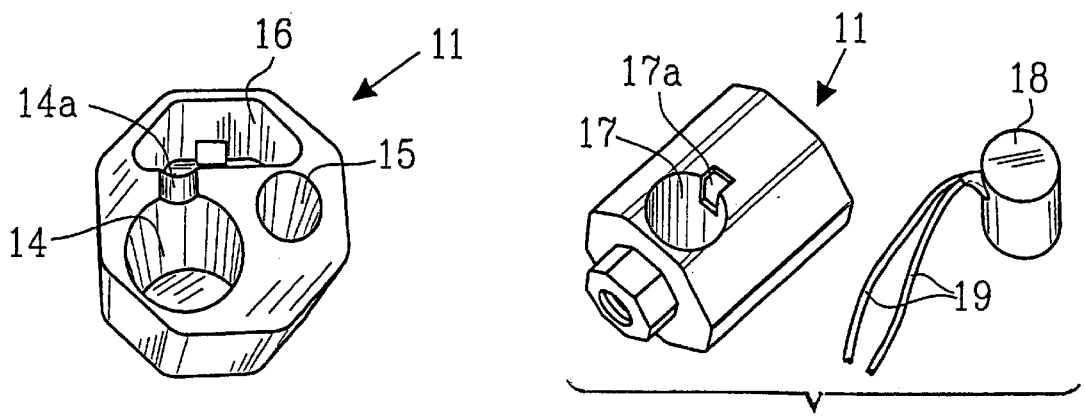
FIG. 4 is a perspective end view of the retainer as shown in FIGS. 2 and 3.
FIG. 5 is a perspective exploded view showing the retainer obliquely from two longitudinal sides and the end side opposite to that shown in FIG. 4, and also an accelerometer to be inserted in the retainer.

FIG. 4 shows, in an end view, one end of the retainer 11 illustrated, e.g., in FIG. 3. As can be seen in this view the retainer 11, which is preferably made from plastic material, in the preferred embodiment illustrated has the form of a hexagonal rod, with three recesses 14, 15, 16 extending axially into the rod from this end. A first recess 14 formed as a cylindrical bore, is intended to receive a vibration sensor or accelerometer formed as a cylindrical body and, e.g., of the type described above. A second, smaller recess 15, is intended to house the cable 12, whereas the third recess 16, having in this embodiment a cross section of a truncated triangle (i.e. a trapezoid), is intended to contain a printed circuit board (PCB) arranged to drive the sensors contained in the retainer 11. A groove 14a is recessed between the first recess 14 and the third recess 16 for passage of conduits interconnecting the first vibration sensor with the PCB.

In FIG. 5 the same retainer 11 as shown in FIG. 4 is shown in perspective from the opposite end side and from the long side of the retainer positioned on top in FIG. 4. From this view can be seen that the retainer 11 in this long side has a fourth recess 17 arranged at right angles to the first recess 14, and like that recess 14, being made as a cylindrical bore and intended to house a second vibration sensor or accelerometer 18, e.g., of the Monitran-type mentioned above. As can be seen, the wall of the fourth recess 17 has a smaller opening 17a for accommodating conduits between the accelerometer and the PCB in the third recess 16. This figure also shows the accelerometer 18 with conduits 19, the accelerometer being of the type intended to fit into the first and fourth recesses 14, 17 in the retainer.

Figure 6:
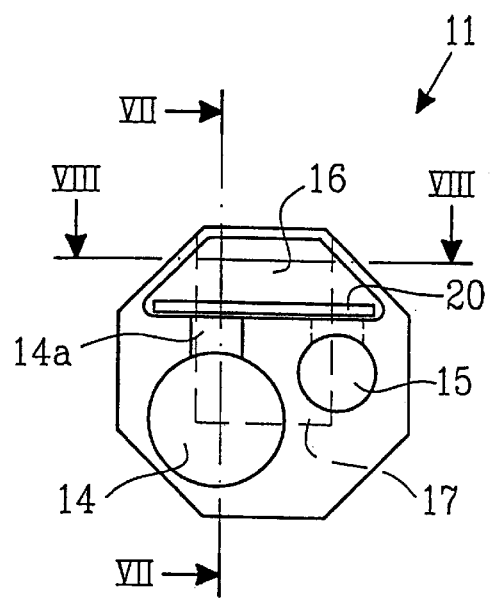
FIG. 6 shows the retainer from the end seen in FIG. 4.
Figure 7:
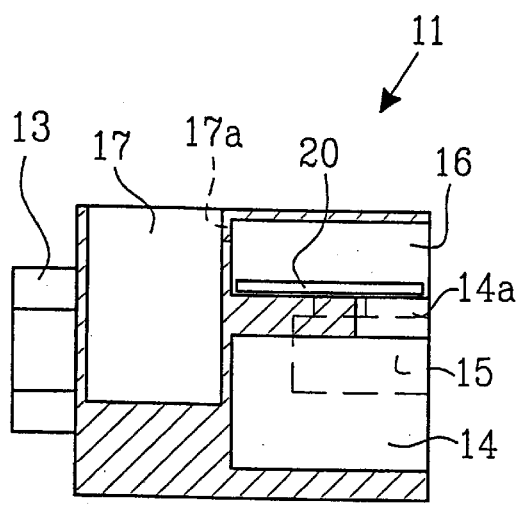
FIG. 7 is a cross-sectional view taken along line VII—VII in FIG. 6.
Figure 8:
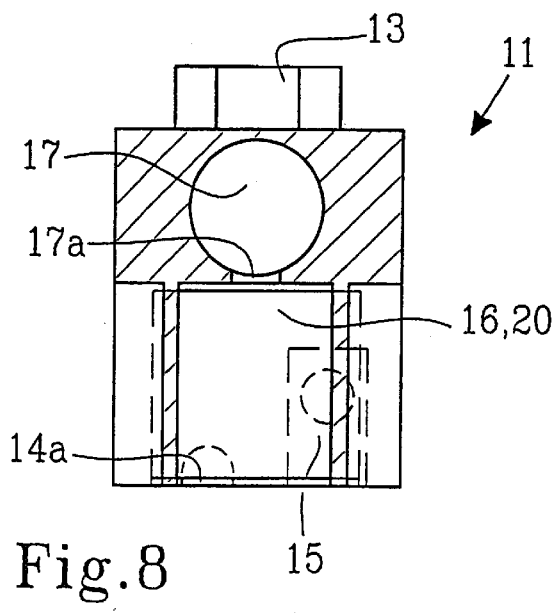
FIG. 8 is a cross sectional view taken along line VIII—VIII in FIG. 6.

FIGS. 6–8 show schematically different views of the retainer 11 according to the invention, whereby FIG. 6 is an end view from the same end as shown in FIG. 4. FIG. 7 shows the retainer 11 in a side view, and FIG. 8 in a view from above, whereby the presentations are made in the same manner as in FIG. 6. In these figures the PCB positioned in the third recess 16 is also shown at 20.

The function of the accelerometers 18 is known per se, and by the positioning of the at least two vibration sensors or accelerometers 18 perpendicularly to each other, readings can be obtained for detecting vibrations in two opposed directions, i.e., axially by the sensor in the first recess 14 and radially by the sensor in the fourth recess 17. It will be appreciated that the "axial" and "radial" directions are considered with reference to the axis defined by the circular openings 5. By making use of the cavities under the base portion of the bearing, housing, which were primarily intended for other purposes (e.g., weight reduction), and which have been used for such other purposes for several years, there is obtained a protected positioning for the retainer and the sensors and PCB contained therein. By this positioning of the vibration sensing means in the present, concealed area located in the exterior of the bearing housing, the retainer will not intrude on the limited space in the interior of the bearing housing. Furthermore, it is easy to position therein the retainer with its incorporated sensors thus that the sensors can safely detect vibrations in axial and radial directions of the bearing housing.

The invention is not limited to the embodiment shown in the accompanying drawings and described in connection thereto, but modifications and variations are possible within the scope of the accompanying claims.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A bearing housing including a base portion having a bottom exterior surface in which a cavity arrangement is formed, at least two vibration-detecting sensors disposed within the cavity arrangement and situated therein completely interiorly with respect to a plane defined by the bottom exterior surface, the sensors arranged to detect vibrations in two perpendicularly opposed directions.

2. The bearing housing according to claim 1 wherein the sensors are arranged in a retainer detachably attached to a wall of the cavity arrangement.

3. The bearing housing according to claim 2 wherein the retainer has a first recess arranged to receive a first of said sensors and a second recess positioned perpendicularly to the first recess and arranged to receive a second of said sensors, said first and second recesses being dimensioned and shaped to retain the first and second sensors in a non-movable manner.

4. The bearing housing according to claim 3 wherein the retainer has a third recess receiving a cable for communication with external equipment, and a fourth recess receiving a printed circuit board connected to drive the first and second sensors.

5. The bearing housing according to claim 4 wherein the bearing includes at least one circular recess for receiving a bearing and defining an axis, the retainer having a generally parallelepipedic shape and arranged to position the first and second sensors in axial and radial directions, respectively, with reference to the axis defined by the at least one circular recess.

6. The bearing housing according to claim 2 wherein the retainer has a recess receiving a cable for communication with external equipment, and a recess receiving a printed circuit board connected to drive the first and second sensors.

7. The bearing housing according to claim 6 wherein the bearing includes at least one circular recess for receiving a bearing and defining an axis, the retainer having a generally parallelepipedic shape and arranged to position the first and second sensors in axial and radial directions, respectively, with reference to the axis defined by the at least one circular recess.

8. The bearing housing according to claim 1 wherein the bearing arrangement comprises a plurality of recesses, all of the senors arranged in one of the cavities.

* * * * *